United States Patent
Hong et al.

(10) Patent No.: US 12,485,850 B2
(45) Date of Patent: Dec. 2, 2025

(54) WIPER ARM, WIPER, AND VEHICLE

(71) Applicant: VALEO SYSTEMES D'ESSUYAGE, La Verriere (FR)

(72) Inventors: Haoyi Hong, Shanghai (CN); Jinlong Pu, Shanghai (CN)

(73) Assignee: Valeo Systemes d'Essuyage, Bobigny (FR)

( * ) Notice: Subject to any disclaimer, the term of this patent is extended or adjusted under 35 U.S.C. 154(b) by 0 days.

(21) Appl. No.: 18/039,032

(22) PCT Filed: Nov. 19, 2021

(86) PCT No.: PCT/CN2021/131822
§ 371 (c)(1),
(2) Date: May 26, 2023

(87) PCT Pub. No.: WO2022/111395
PCT Pub. Date: Jun. 2, 2022

(65) Prior Publication Data
US 2024/0010169 A1   Jan. 11, 2024

(30) Foreign Application Priority Data
Nov. 26, 2020 (CN) .......................... 202022775768.X

(51) Int. Cl.
*B60S 1/34* (2006.01)
*B60S 1/52* (2006.01)

(52) U.S. Cl.
CPC ............ *B60S 1/3415* (2013.01); *B60S 1/3479* (2013.01); *B60S 1/522* (2013.01); *B60S 1/3445* (2013.01)

(58) Field of Classification Search
CPC ........ B60S 1/522; B60S 1/524; B60S 1/3415; B60S 1/3479; B60S 1/3445
(Continued)

(56) References Cited

U.S. PATENT DOCUMENTS 3,149,361 A    9/1964  Ziegler
3,827,101 A *  8/1974  Wubbe ................... B60S 1/522
                                                       15/250.04
(Continued)

FOREIGN PATENT DOCUMENTS

CN    103129527 A    6/2013
CN    206704156 U    12/2017
(Continued)

OTHER PUBLICATIONS

Machine translation of WO publication 02/00480, published Jan. 2002. (Year: 2002).*

(Continued)

*Primary Examiner* — Katina N. Henson
(74) *Attorney, Agent, or Firm* — Valeo Systemes D'essuyage

(57) ABSTRACT

A wiper arm and a wiper for a vehicle, and a vehicle are disclosed. The wiper arm of a wiper for a vehicle has a wiper arm seat for connecting to a driver, a wiper arm end piece for holding a wiper blade of the wiper, and an arm portion arranged between the wiper arm seat and the wiper arm end piece. The arm portion is fixedly connected to the wiper arm end piece and can rotate relative to the wiper arm seat, the wiper arm is provided with at least one spray unit, wherein the spray unit is provided with a conduit and a spray nozzle, the conduit being guided along the wiper arm, and the spray nozzle being arranged at one end of the conduit, wherein the arm portion is provided with a cover plate, and the spray nozzle is at least held at the cover plate.

9 Claims, 5 Drawing Sheets

(58) Field of Classification Search
USPC .......................................... 15/250.04, 250.351
See application file for complete search history.

(56) References Cited

U.S. PATENT DOCUMENTS

| | | | | |
|---|---|---|---|---|
| 3,940,068 | A | * | 2/1976 | Mohnach ................ B05B 15/60 15/250.04 |
| 5,239,726 | A | * | 8/1993 | Bianco ................. B60S 1/3415 15/250.4 |
| 2007/0089257 | A1 | | 4/2007 | Harita et al. |
| 2016/0121853 | A1 | * | 5/2016 | Uchiyama ............. B60S 1/3468 15/250.04 |

FOREIGN PATENT DOCUMENTS

| | | | | |
|---|---|---|---|---|
| CN | 211335898 | U | | 8/2020 |
| CN | 212796794 | U | | 3/2021 |
| CN | 213502202 | U | | 6/2021 |
| CN | 113799739 | A | | 12/2021 |
| DE | 102014205538 | A1 | * 10/2015 | ........... B60S 1/3415 |
| EP | 3415380 | A1 | | 12/2018 |
| JP | S61-173285 | A | | 8/1986 |
| JP | S63-79684 | U | | 5/1988 |
| JP | 2004-306665 | A | | 11/2004 |
| JP | 2005-331112 | A | | 12/2005 |
| JP | 2006096074 | A | | 4/2006 |
| JP | 2007-272979 | A | | 10/2007 |
| JP | 2008-126955 | A | | 6/2008 |
| JP | 2009-113737 | A | | 5/2009 |
| JP | 2016-094087 | A | | 5/2016 |
| JP | 2017-210110 | A | | 11/2017 |
| WO | WO-0200480 | A1 | * 1/2002 | ............... B60S 1/32 |
| WO | 2021043499 | A1 | | 3/2021 |

OTHER PUBLICATIONS

Office Action issued in counterpart Japanese Patent Application No. 2023-532217 mailed May 7, 2024 (10 pages).
International Search Report and Written Opinion in corresponding International Application No. PCT/CN2021/131822, dated Feb. 15, 2022 (13 pages).
Japan Patent Office, Office Action of corresponding Japanese Patent Application No. 2023-532217, dated Oct. 15, 2024.
Japan Patent Office, Decision to Grant (with English translation) for corresponding Japanese Patent Application No. 2023-532217, dated Jan. 7, 2025, 5 pages.

\* cited by examiner

WIPER ARM, WIPER, AND VEHICLE

TECHNICAL FIELD

The present invention relates to a wiper arm, wiper, and vehicle.

BACKGROUND

A wiper plays an important role in means of transportation, and is used to clean rainwater or other dirt on the windshield that affects the driver's vision, ensuring driving safety.

In a traditional wiper, the wiper assembly is separated from the cleaning assembly. The cleaning assembly is hidden under the front hatch. When the windshield needs to be cleaned, the cleaning assembly sprays cleaning fluid onto the surface of the windshield, and then the wiper assembly starts operating. Since the cleaning fluid is sprayed onto the entire surface, this may require a large amount of the cleaning fluid to clean the windshield.

In recent years, we have seen more and more wipers that integrate the spray nozzles for the cleaning fluid into the wiper assemblies. In this regard, the spray nozzle is connected to the cleaning fluid storage through a conduit. The conduit extends along the wiper arm of the wiper assembly between the wiper arm and the windshield.

Therefore, a reliable structure is needed to prevent the conduit from being exposed from below the wiper arm, as an exposed conduit is more susceptible to external environmental influences, such as premature aging arising from exposure to sunlight and damages caused by foreign objects, which is unfavorable for the service life of the conduit.

SUMMARY

Therefore, the present invention aims to provide a wiper arm so that a wiper and a vehicle with the wiper arm can at least partially solve the technical problems mentioned above.

A wiper arm for a vehicle is proposed according to the present invention, comprising a wiper arm seat for connecting to a driver, a wiper arm end piece for holding the wiper blade and at least one arm portion arranged between the wiper arm seat and the wiper arm end piece, wherein the arm portion is fixedly connected to the wiper arm end piece and can rotate relative to the wiper arm seat, the wiper arm is also provided with at least one spray unit that is provided with a conduit and a spray nozzle, wherein the conduit is guided along the wiper arm, the spray nozzle is arranged at one end of the conduit, the arm portion is provided with a cover plate, and the spray nozzle is at least held at the cover plate.

In the wiper arm, especially in the arm portion of the wiper arm that is directly connected to the wiper arm seat, a U-shaped cross section is usually provided to accommodate the related components inside, e.g., the spring used to apply a preload to the wiper blade assigned to the wiper arm to press it snug onto the windshield of the vehicle, and the conduit of the spray unit. Providing a cover plate for such an arm portion enables the cover plate to seal the open side, reliably preventing the components contained inside from being exposed, especially preventing the conduit from being damaged due to exposure to the outside.

Furthermore, when the spray nozzle is held at the cover plate, the installation or guidance of the conduit connected to the spray nozzle is simpler compared to the arm portion with a U-shaped cross section. In addition, the spray unit can be installed by simply fitting the cover plate in place on the arm portion.

According to an embodiment of the present invention, the spray nozzle is provided with an opening, the cover plate is provided with a raised first wall, a local area at the top of the first wall has a protrusion, and the width of the protrusion is greater than that of the opening, wherein the first wall is inserted into the opening, and the protrusion extends through and out of the opening; the spray nozzle is also provided with a groove, and at least a portion of one side wall of the groove is in the form of a hook, the hook being snapped into the corresponding orifice of the arm portion.

Through the fit between the opening of the spray nozzle and the first wall, and the protrusion which prevents the spray nozzle from falling off the first wall, at least the initial positioning of the spray nozzle relative to the arm portion can be realized when the cover plate is installed onto the corresponding arm portion. Next, the hook of the spray nozzle is snapped into the orifice of the arm portion to achieve the final positioning of the spray nozzle relative to the arm portion. Here, one side of the arm portion is accommodated in the groove of the spray nozzle. This enables simple assembling.

According to an embodiment of the present invention, the cover plate is provided with a raised second wall, and the spray nozzle is held at the second wall. This can further achieve simple assembling.

Exemplarily, the spray nozzle is provided with an opening, the width of the second wall corresponds to that of the opening, steps and elastic clips are set in pairs on two sides of the longitudinal side, and the second wall is inserted into the opening, wherein the distance between the vertical planes of the steps corresponds to the length of the opening, one side of the spray nozzle surrounding the area of the opening leans against the horizontal plane of the steps, while the clips lean against the opposite side.

According to an embodiment of the present invention, the cover plate is provided with pairs of third walls for guiding the conduit. The third walls can be arranged in pairs, allowing the conduit to be accommodated between the third walls, which further facilitates the positioning of the conduit and prevents potential damages due to contact between the conduit and other moving members.

According to the embodiment of the present invention, the spray nozzle is provided with a plurality of spouts capable of spraying in different directions. This will make the cleaning fluid be more smoothly and evenly sprayed onto the windshield to achieve better cleaning effects.

According to an embodiment of the present invention, the cover plate is a one-piece design. For example, the cover plate can be formed by plastic, especially weather resistant plastic, through injection molding. Of course, other materials or molding methods are also feasible.

According to another aspect of the present invention, a wiper for a vehicle is also proposed, the wiper being provided with the aforementioned wiper arm and blade, and the blade being kept at the wiper arm.

According to another aspect of the present invention, a vehicle is also proposed, and the vehicle is provided with the aforementioned wiper arm or wiper.

BRIEF DESCRIPTION OF THE DRAWINGS

The present invention is further explained below with the aid of the drawings. In the drawings.

DETAILED DESCRIPTION OF THE EXEMPLARY EMBODIMENTS

Figure 1:
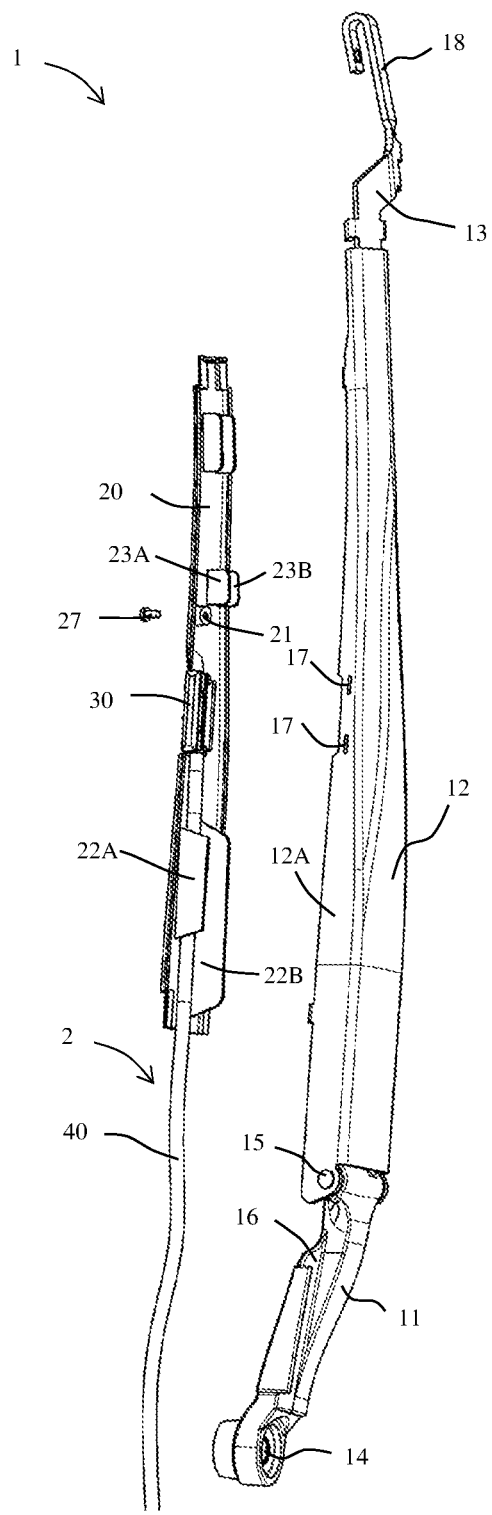
FIG. 1 schematically shows a disassembly diagram of an embodiment of the wiper arm according to the present invention.

Below is an exemplary description of embodiments of the present invention. As those skilled in the art should be aware, the described embodiments can be modified in various ways without deviating from the concept of the present invention. Thus, the drawings and description are essentially exemplary rather than limiting. In the following text, identical reference numerals generally denote elements with identical or similar functions.

FIG. 1 schematically shows a disassembly diagram of the wiper arm 1 according to the present invention, which is used for the wiper of a vehicle. The wiper arm 1 comprises a wiper arm seat 11 for connecting to the driver, a wiper arm end piece 13 for holding the wiper blade, and at least one arm portion 12 arranged between the wiper arm seat 11 and the wiper arm end piece 13. The wiper arm seat 11, arm portion 12, and wiper arm end piece 13 are connected to each other in a longitudinal shape, wherein the arm portion 12 is fixedly connected to the wiper arm end piece 13 and can rotate relative to the wiper arm seat 11.

The attached drawings show only the components of the wiper arm 1 that are used to illustrate the present invention, and the wiper arm also includes other known components that are not shown, such as the spring that applies a preload.

In the case of setting a plurality of arm portions, they can have different cross-sectional shapes and are fixedly connected to each other. Specifically, arm portions can be appropriately selected based on the shape of other components of the wiper arm. For example, one arm portion may have a U-shaped cross section, while the other arm portion may be rod-shaped, and they are riveted together. Here, the wiper arm end piece 13 and the wiper arm seat 11 are respectively located on two sides of the arm portions connected together, wherein the wiper arm seat 11 can rotate relative to the other aforementioned components of the wiper arm 1.

The drawing in FIG. 1 schematically shows only one arm portion 12 with a U-shaped cross section. The arm portion 12 is pivotally connected to the wiper arm end piece 11 on one side through a pivot 15 and is riveted to the wiper arm end piece 13 on the other side, and the wiper arm end piece 13 is made by punching and is provided with a hook 18 used for the blade.

Figure 2:
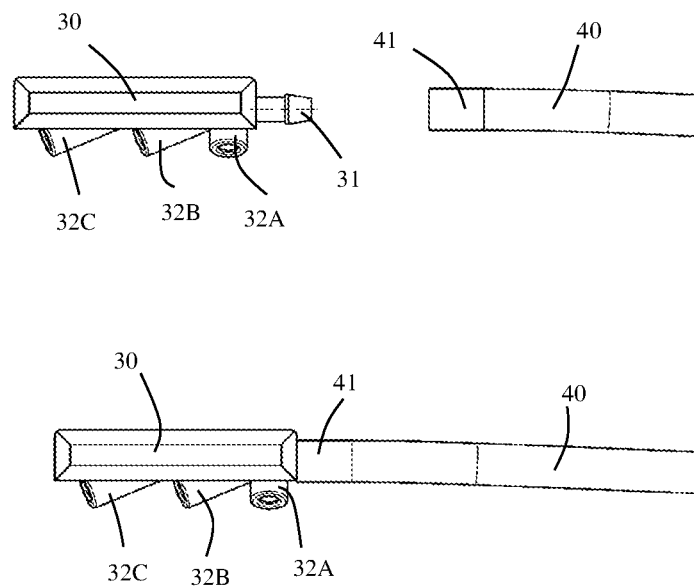
FIG. 2 schematically shows the disassembly diagram and assembly diagram of the spray unit for the wiper arm shown in FIG. 1.

As shown in FIG. 1, the wiper arm 1 is provided with at least one spray unit 2, which is provided with a conduit 40 and a nozzle 30 that can be detachably connected together. The detached state and the connected state of the spray unit 2 are shown respectively in the upper and lower diagrams of FIG. 2, wherein the connector 31 of the nozzle 30 is connected to the end 41 of the conduit 40. The conduit 40 and nozzle 30 connected together are placed on the cover plate 20 assigned to the above-mentioned arm portion 12, and the arm portion 12 is preferably adjacent to the wiper arm end piece 11. Therefore, sealing the open side of the arm portion 12 using the cover plate 20 can prevent the portion of the conduit 40, especially the portion introduced into the arm portion 12, from being unexpectedly exposed from the wiper arm, to better protect the conduit. Therefore, the geometric structure of the cover plate 20 matches that of the open side of the arm portion 12. FIG. 1 shows that the cover plate 20 is fastened to the arm portion 12 by threading the screw through the orifice 21 set on the cover plate 20 and screwing into the threaded hole, not shown, of the arm portion 12. Of course, the cover plate 20 can be fixed to the arm portion 12 in any appropriate way, e.g., clamping or bonding.

There is a recess 16 left in the wiper arm end piece 13 of the wiper arm 1, which is used to guide the conduit 40 into the arm portion 12. The wiper arm end piece 13 also has an interface 14 reserved on the opposite end of the arm portion for engaging the output shaft of the driver, allowing the wiper arm to swing back and forth.

Figure 3:
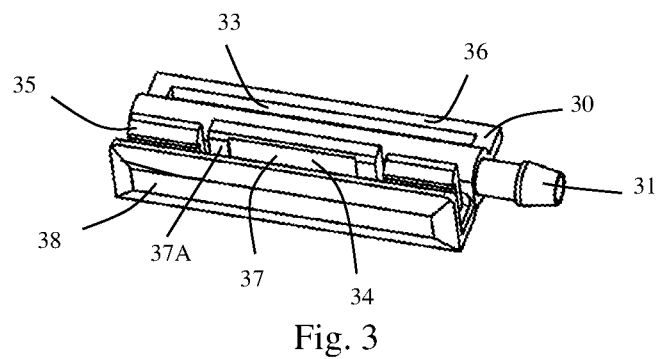
FIG. 3 schematically shows the spray nozzle of the wiper arm shown in FIG. 1.
Figure 4:
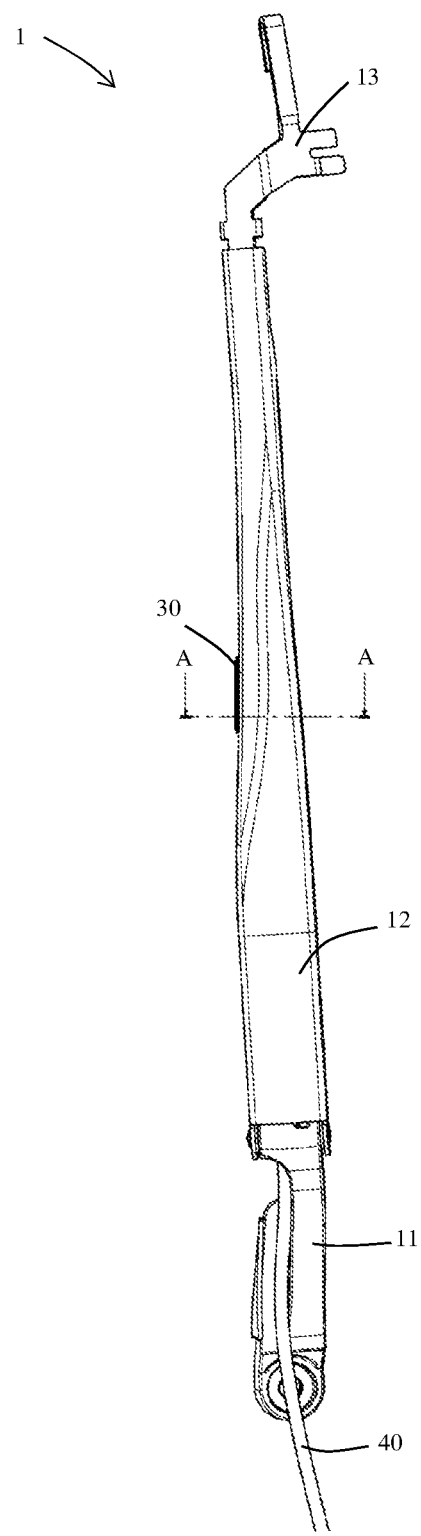
FIG. 4 shows a top view of the wiper arm shown in FIG. 1.
Figure 5:
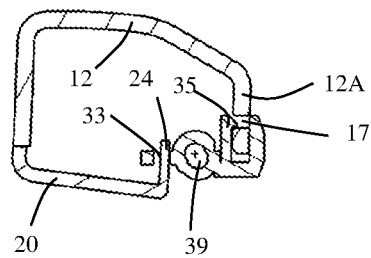
FIG. 5 shows a section diagram along line A-A shown in FIG. 4.
Figure 6:
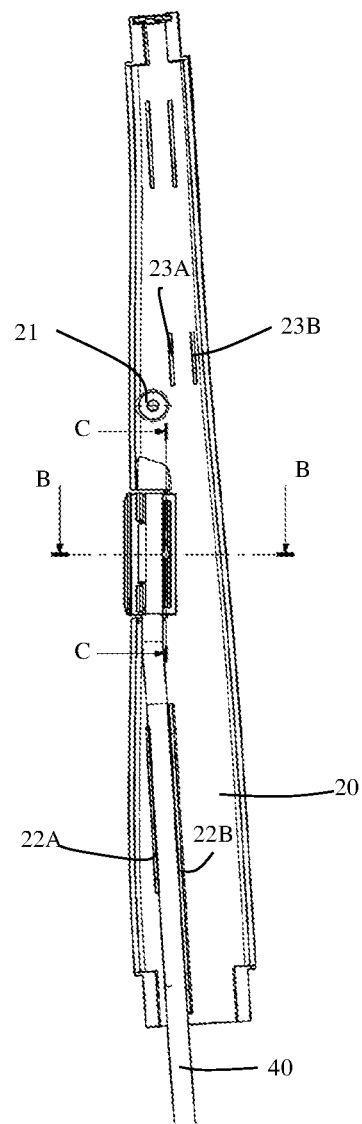
FIG. 6 shows an illustration of the cover plate for the wiper arm shown in FIG. 1, wherein the cover plate is provided with the nozzle unit shown in FIG. 2.
Figure 7:
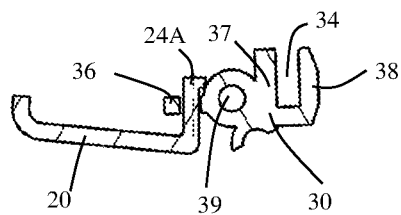
FIG. 7 shows a section diagram along the line B-B shown in FIG. 6.
Figure 8:
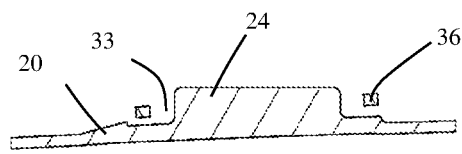
FIG. 8 shows a section diagram along the line C-C shown in FIG. 6.

FIG. 3 shows a three-dimensional diagram of the nozzle 30. It can be seen that, in addition to the connector 31, the nozzle 30 is also provided with an opening 33 and a groove 34, which can be located on two sides of the flow channel 39 of the nozzle and used for interacting with the relevant positions of the cover plate 20 and the arm, respectively. Specifically, the cover plate 20 is provided with a raised first wall 24, a local area at the top of the first wall 24 has a protrusion 24A, and the width of the protrusion 24A is greater than that of the opening 33, wherein the first wall 24 is inserted into the opening 33, and the protrusion 24A extends through and out of the opening 33, as shown in FIGS. 4 to 8; one side wall of the arm portion 12 is provided with an orifice 17, and at least a portion of one side wall of groove 34 is in the form of a hook 35, and the hook 35 is snapped into the orifice of the arm portion 12. In this embodiment, the frame 36 and hook 35 forming the opening 33 show a certain degree of elasticity to facilitate engagement.

In particular, the distance between the side walls 37 and 38 of the groove 34 corresponds to the width of the wall of the arm portion 12 that is to be inserted, to avoid lateral movement of the nozzle 30. To reduce the manufacturing cost, for example, a rib 37A can be installed on one of the side walls 37 and 38.

Additionally, the cover plate 20 may be preferably provided with pairs of third walls for guiding the conduit 40. Two pairs of third walls 22A-22B and 23A-23B are shown in the attached drawings. In the installed state, the conduit 40 is located between the additional third walls, thereby limiting the position of the conduit 40 and preventing the conduit from coming into contact with other components in the wiper arm. The other pair of third walls 23A and 23B shown in the figure can be used for another conduit that may exist but is not shown.

Therefore, the opening 33 set can be regarded as being used for initial positioning of the nozzle 30. After the nozzle 30 is inserted into the first wall 24 of the cover plate 20 through the opening, the protrusion 24A is used to prevent the nozzle 30 from falling off the cover plate 20. Here, after the spray nozzle 30 is connected to the conduit 40, the spray nozzle can be inserted into the cover plate; alternatively the conduit can be connected to the spray nozzle after the spray nozzle is inserted into the cover plate. Due to the basically planar structure of the cover plate as a whole, the above operation can be easily achieved. Next, the cover plate with the spray unit is installed onto the relevant arm portion, and the spray nozzle 30 can be coupled onto the wall of the arm portion 12 through the groove 34 to achieve final fixation of the spray nozzle. Especially in the case that the cover plate 20 is provided with a guide wall for the conduit, this can achieve the correct positioning desired for the spray nozzle and the conduit in the wiper arm.

The spray nozzle 30 may be provided with a plurality of spouts capable of spraying in different directions, The example given shows that the nozzle 30 is provided with spouts 32A, 32B, and 32C that point to three directions respectively. Therefore, the cleaning fluid can be more smoothly and evenly sprayed onto the windshield to achieve better cleaning effects.

The cover plate can be a one-piece design. For example, the cover plate can be formed by plastic, especially weather resistant plastic, through injection molding. Of course, other materials or molding methods are also feasible. The cover plate is preferably assigned to an arm portion with a U-shaped cross section, e.g., an arm portion adjacent to the wiper arm end piece. The provision of the cover plate can also improve the aerodynamic effect of the wiper arm.

Figure 9:
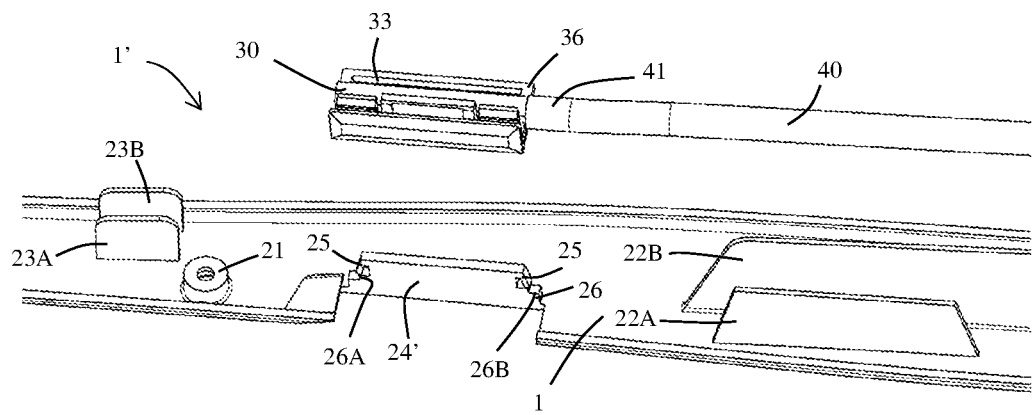
FIG. 9 schematically shows a disassembly diagram of another embodiment of the wiper arm according to the present invention.
Figure 10:
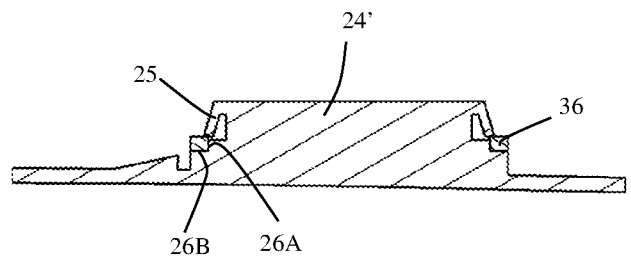
FIG. 10 shows a section diagram of the wiper arm shown in FIG. 9 corresponding to the section diagram shown in FIG. 8.

FIGS. 9 to 10 show another embodiment of the wiper arm 1' according to the present invention. Unlike the above embodiment, the wiper arm 1' is directly held on the cover plate 20, rather than on the cover plate and arm portion. The structure of the wiper arm 1' is basically similar to that of the wiper arm 1. Only its differences from the wiper arm 1' will be explained in the following text, and the above description can be used as reference for the other parts.

In the wiper arm 1', the cover plate 20 is also provided with a raised second wall 24', and the spray nozzle 30 is fixedly held at the second wall 24'. Therefore, the spray nozzle 30 is provided with an opening 33, the width of the second wall 24' corresponds to that of the opening 33, steps 26 and elastic clips 25 are set in pairs on two sides of the longitudinal side, and the second wall 24' is inserted into the opening 33, wherein the distance between the vertical planes 26A of the steps 26 corresponds to the length of the opening 33, one side of the spray nozzle 30 surrounding the area of the opening 33 leans against the horizontal plane 26B of the steps 26, while the clips 25 lean against the opposite side of this area.

The present invention, instead of being limited to the above-described structures, may also have other variants. Although the present invention has already been described by means of a limited number of embodiments, those skilled in the art could, drawing benefit from this disclosure, design other embodiments which do not depart from the scope of protection of the present invention disclosed herein. Thus, the scope of protection of the present invention should be defined by the attached claims alone.

The invention claimed is:

1. A wiper arm for vehicles, comprising:
a wiper arm seat for connecting to a driver;
a wiper arm end piece for holding a wiper blade and an arm portion arranged between the wiper arm seat and the wiper arm end piece, wherein the arm portion is fixedly connected to the wiper arm end piece and rotates relative to the wiper arm seat;
at least one spray unit that is provided with a conduit and a spray nozzle, the conduit being guided along the wiper arm and the spray nozzle being arranged at one end of the conduit, the arm portion is provided with a cover plate, and the spray nozzle held at the cover plate;
wherein said spray nozzle is provided with an opening;
wherein the cover plate is provided with a raised first wall, a local area at a top of the raised first wall having a protrusion, and a width of the protrusion is greater than that of the opening, wherein the raised first wall is configured to be inserted into the opening; and
wherein the protrusion is configured to extend through and out of the opening; and
wherein the spray nozzle is also provided with a groove, where a portion of a side wall of said groove is in the form of a hook.

2. The wiper arm of claim 1, wherein the hook is configured to snap into a corresponding orifice of the arm portion.

3. The wiper arm of claim 1, wherein the cover plate is provided with a raised second wall, and the spray nozzle is fixedly held at the raised second wall.

4. The wiper arm of claim 1, wherein the cover plate is provided with pairs of third walls for guiding the conduit.

5. The wiper arm of claim 1, wherein the spray nozzle is provided with a plurality of spouts capable of spraying in different directions.

6. The wiper arm of claim 1, wherein the cover plate is a one-piece design.

7. A vehicle, comprising:
a wiper arm of claim 1.

8. A wiper arm for vehicles, comprising:
a wiper arm seat;
a wiper arm end piece configured to secure a wiper blade;
an arm portion arranged between the wiper arm seat and the wiper arm end piece, wherein the arm portion rotates relative to the wiper arm seat;
a conduit and a spray nozzle, where the conduit is guided along the wiper arm and the spray nozzle being arranged at an end of the conduit;
the arm portion is provided with a cover plate, and the spray nozzle held at the cover plate, wherein said spray nozzle is provided with an opening;
the cover plate having a raised first wall, a local area at a top of the raised first wall having a protrusion, and a width of the protrusion is greater than a width of the opening, wherein the raised first wall is configured to be inserted into the opening;
wherein the protrusion is configured to extend through and out of the opening;
wherein the spray nozzle is also provided with a groove, where a portion of a side wall of said groove is in the form of a hook; and
the hook being configured to snap into a corresponding orifice of the arm portion.

9. A wiper arm for vehicles, comprising:
a wiper arm seat for connecting to a driver;
a wiper arm end piece for holding a wiper blade and an arm portion arranged between the wiper arm seat and the wiper arm end piece, wherein the arm portion is fixedly connected to the wiper arm end piece and rotates relative to the wiper arm seat;

at least one spray unit that is provided with a conduit and a spray nozzle, the conduit being guided along the wiper arm and the spray nozzle being arranged at one end of the conduit, the arm portion is provided with a cover plate, and the spray nozzle held at the cover plate;

wherein the cover plate is provided with a raised first wall, wherein the spray nozzle is provided with an opening;

wherein the spray nozzle is also provided with a groove, where a portion of a side wall of the groove is in the form of a hook;

wherein the cover plate is provided with a raised second wall, the spray nozzle is fixedly held at the second wall;

a width of the raised second wall corresponds to that of the opening;

a plurality of steps and elastic clips are set in pairs on two longitudinal ends of the raised second wall;

the raised second wall configured to be inserted into the opening;

wherein the distance between vertical planes of the plurality of steps correspond to a length of the opening;

one side of the spray nozzle surrounding an area of the opening leans against a horizontal plane of the plurality of steps, while the plurality of clips lean against a side of the spray nozzle opposing the area of the opening.

* * * * *